United States Patent [19]

Lamont et al.

[11] Patent Number: 5,210,927
[45] Date of Patent: May 18, 1993

[54] PIPETTE TIP FILTER INSERTER AND METHOD THEREFORE

[75] Inventors: Peter L. Lamont, Santa Rosa; Ali Vafaei, Berkeley, both of Calif.

[73] Assignee: Ways & Means, Inc., San Rafael, Calif.

[21] Appl. No.: 716,819

[22] Filed: Jun. 17, 1991

[51] Int. Cl.⁵ .................. B23Q 17/22; B23P 21/00
[52] U.S. Cl. ....................... 29/564.2; 29/33 J;
    29/563; 29/564.6; 29/33 T; 29/709; 29/DIG.
    77; 29/902; 29/234; 210/232
[58] Field of Search ............ 29/564.2, 33 J, 563,
    29/564.6, 564.7, 564.8, 564, 407, 430, 33 T, 705,
    709, 710, 781, 234, 902, DIG. 15, DIG. 77;
    83/155; 210/232; 73/863.23, 863.24, 863.25, 83,
    864.01, 864.14

[56] References Cited

U.S. PATENT DOCUMENTS

| | | | |
|---|---|---|---|
| 3,605,240 | 9/1971 | Avery, Jr. et al. | 29/564.6 X |
| 3,758,937 | 9/1973 | Ott | 29/564.6 |
| 3,959,870 | 6/1976 | Klein | 29/790 |
| 4,001,929 | 1/1977 | Ishikawa | 29/235 X |
| 4,136,433 | 1/1979 | Copeland et al. | 29/564.6 |
| 4,274,194 | 6/1981 | Rizzo | 29/235 X |
| 4,398,327 | 8/1983 | Yamazaki | 29/564.8 X |
| 4,523,366 | 6/1985 | Lodge et al. | 29/564.6 |
| 4,568,520 | 2/1986 | Ackermann et al. | 73/863.23 X |
| 4,951,513 | 8/1990 | Koike | 73/863.25 X |

Primary Examiner—Tom Noland
Attorney, Agent, or Firm—Phillips, Moore, Lempio & Finley

[57] ABSTRACT

A method for and a device to insert filters into disposable pipette tips uses a turntable adapted to receive a plurality of tips adjacent its circumference and powered by a stepping motor to incrementally rotate pipette tips to various positions for appropriate actions. After a tip is placed in the turntable, it is moved successively to a position where a filter of predetermined size may be inserted into the tip. The filter is then tamped into the desired final position at still another position. After checking for the presence of a filter, the pipette is removed from the turntable.

15 Claims, 10 Drawing Sheets

PIPETTE TIP FILTER INSERTER AND METHOD THEREFORE

BACKGROUND OF THE INVENTION

This invention relates to a device and a method for inserting filters in disposable pipette tips.

In the past twenty years laboratory procedures, particularly in the medical field, have turned almost exclusively to disposable pipette tips. Further, the number of tests performed have resulted in multiple pipetters utilizing several tips at one time. As the name implies the disposable pipette tip is used once and thrown away principally for an insurance that the sample will not be contaminated by a reused pipette.

With the criticality of tests becoming more important particularly in the medical field due to the impact on the patient, the elimination of all forms of contamination has become even more critical. One area that has not been adequately addressed in the past is the possibility of contamination of the sample from the ambient gas be it air or some other gas in the pipetter as the sample is drawn into the pipette tip. In like manner, there may be particulate matter in the pipetter which could contaminate the biological sample. With a filter in the tip such a possibility is to all intents eliminated.

In addition to the possible contamination of the sample by the ambient air or gas in the pipetter, there further exists the possibility that the sample drawn into the tip will come in contact with the pipetter through carelessness in use of the instrument or through failure of the instrument itself. Should contact of the sample with the pipetter occur, it may be necessary to destroy the pipetter due to the inability of the user to properly insure decontamination of the instrument.

Accordingly, it has become incumbent upon the manufacturers of disposable pipette tips to insert a filter in the tip that will reside between the sample and the pipetter. The requirements of the filter are that it be porous to the air or gas utilized to create the suction in the pipette tip itself thereby permitting the sample to be drawn into the tip and that it be sufficiently absorbent so that should any liquid in the sample move upward in the tip, the filter will be sufficiently large to block free flow of the sample into the upper portion of the tip. Finally, the tip should be sufficiently impervious to gas and air so that there would be no immediate mixing of the gas or air that is contained in the pipetter with the sample drawn into the pipette tip before the sample is ejected into the sample dish. In like manner, if there are any aerosol contaminants in the vicinity of the sample the filter can prevent, to a great extent, such aerosols from migrating into the vicinity of the pipetter with possible contamination of the pipetter.

The description above relates to contamination of the pipetter by a sample being drawn into the pipette tip. In laboratory procedures it is equally likely that a testing fluid will be added to a biological sample by means of the pipetter to perform a test or determine the outcome of the particular test. Such testing fluids added to samples may range from a simple acid basic tests to much more complex biological tests wherein materials may be added to the sample to promote growth over a period of time in order to determine the presence or absence of bacteria or a virus or the like. In these instances it is particularly important that the reagent or the like drawn up into the pipette tip for use in application to a biological sample be contaminant free. Thus, in the manner described above, the presence of a filter can insure to a great degree the safety of the test.

While filters have been placed in pipette tips in the past, the positioning of the filter in the tip is tedious and time consuming in that it is hand labor. That is, the tips have filters inserted by individuals requiring the filter to be carefully inserted in the tip and then tamped into position one tip at a time. Such efforts have added immensely to the costs of filter equipped tips. Further, while the use of humans in such a process may insure that each tip receives a filter, it cannot insure that the filters be properly placed as each tip may receive a slightly different treatment.

Finally, as a corollary to the presence of a filter in a tip, such a filter is a good indication of the capacity of the pipette tip. That is the position of the filter in the tip can be used as an indication of an overfill if the fluid in either the sample or the reagent is drawn up to the level of the filter. Thus, a pipetter that is utilized for a half milliliter sample would have the filters positioned in the disposable tip sufficiently far up from the tip end so that a half milliliter sample or reagent may be drawn into the tip without contact with the filter. Should the operator observe the sample or reagent reaching the filtered area then it will become immediately apparent that an over supply of sample or reagent had been drawn into the pipette tip and the test can be abandoned at that point.

It is for this latter reason that the human insertion of filters and pipette tips becomes difficult as the human could position the filter at an incorrect point in the tip.

It is therefore an object of this invention to provide a device that inserts filters into pipette tips.

It is a further object of the invention to provide a machine that will cut filters from an elongated piece of filter material and insert the cut filter at a proper position in the pipette tip.

It is also an object of this invention to cut filters of sufficient length so that adequate filter protection is provided in the pipette tip.

It is still another object of this invention to provide a machine which includes a turntable in which pipette tips are positioned so that filters may be inserted therein.

It is still another object of this invention to provide means associated with the turntable wherein the positioning of the pipette tip in the turntable may be checked prior to the insertion of a filter therein.

It is also an object of this invention to provide means for position the filter at a particular point in the pipette tip.

It is another object to this invention to check to insure that the pipetter tip has had a filter properly placed therein.

Finally, it is an object of this invention to include means for withdrawing pipette tips from the turntable after the filter has been inserted.

SUMMARY OF THE INVENTION

The invention disclosed herein includes a device for cutting and inserting filters in pipette tips. The device includes a turntable or conveyor for transporting a pipette tip from a first position to at least a subsequent later position. The device includes a structure for cutting off a predetermined length of an elongated fiber filter and an inserter for inserting the predetermined length of the elongated fiber filter into the pipette tip. Finally, a pipette tip is checked to determine if the pipette tip has received a filter before it is removed from the conveying device.

A method is disclosed for inserting the filter in a pipette tip that comprises the steps of providing a multi-station turntable rotatable in fractions of a revolution wherein the fractions are equally divisible into a circumference of a circle. The method also includes placing a pipette tip in one station of the multi-station turntable then rotating the multi-station turntable one fraction of the circumference where the pipette tip is checked to see the positioning of the inserted tip. The method includes stopping further rotation of the turntable if the pipette is tip is incorrectly positioned else rotating the turntable to a third position where a filter of predetermined length is provided to said filter. The method includes rotating the turntable to a fourth position so that the filter may be tamped to a final position in the pipette tip before rotation to a fifth position is undertaken. At the fifth position the method includes checking to see if the pipette tip includes a filter. Finally, the turntable is rotated to a sixth position where the pipette tip is removed from the turntable.

DETAILED DESCRIPTION OF THE PREFERRED EMBODIMENT

Figure 1:
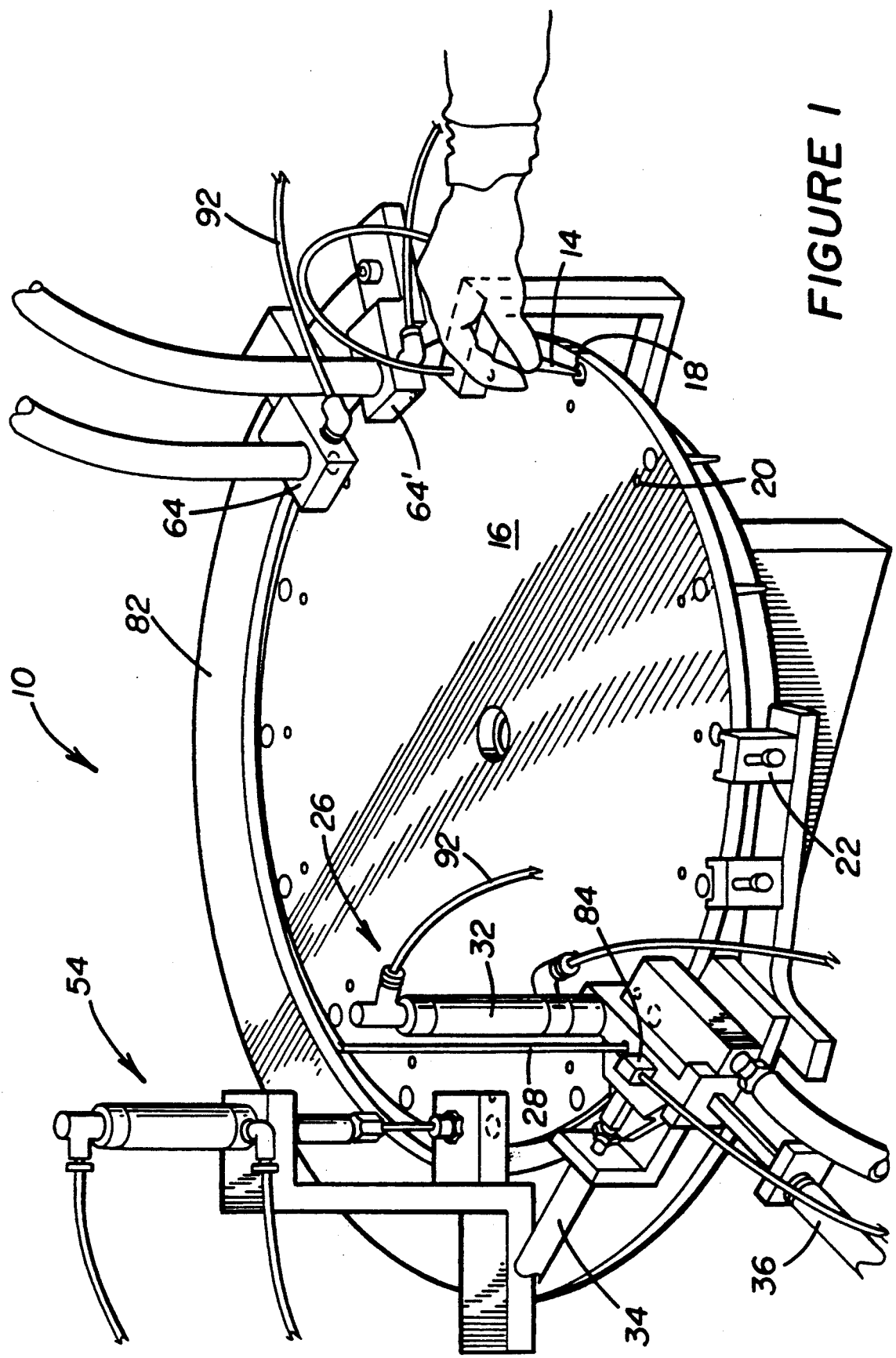
FIG. 1 is a perspective view of a preferred embodiment of the filter inserter.
Figures 2, 8:
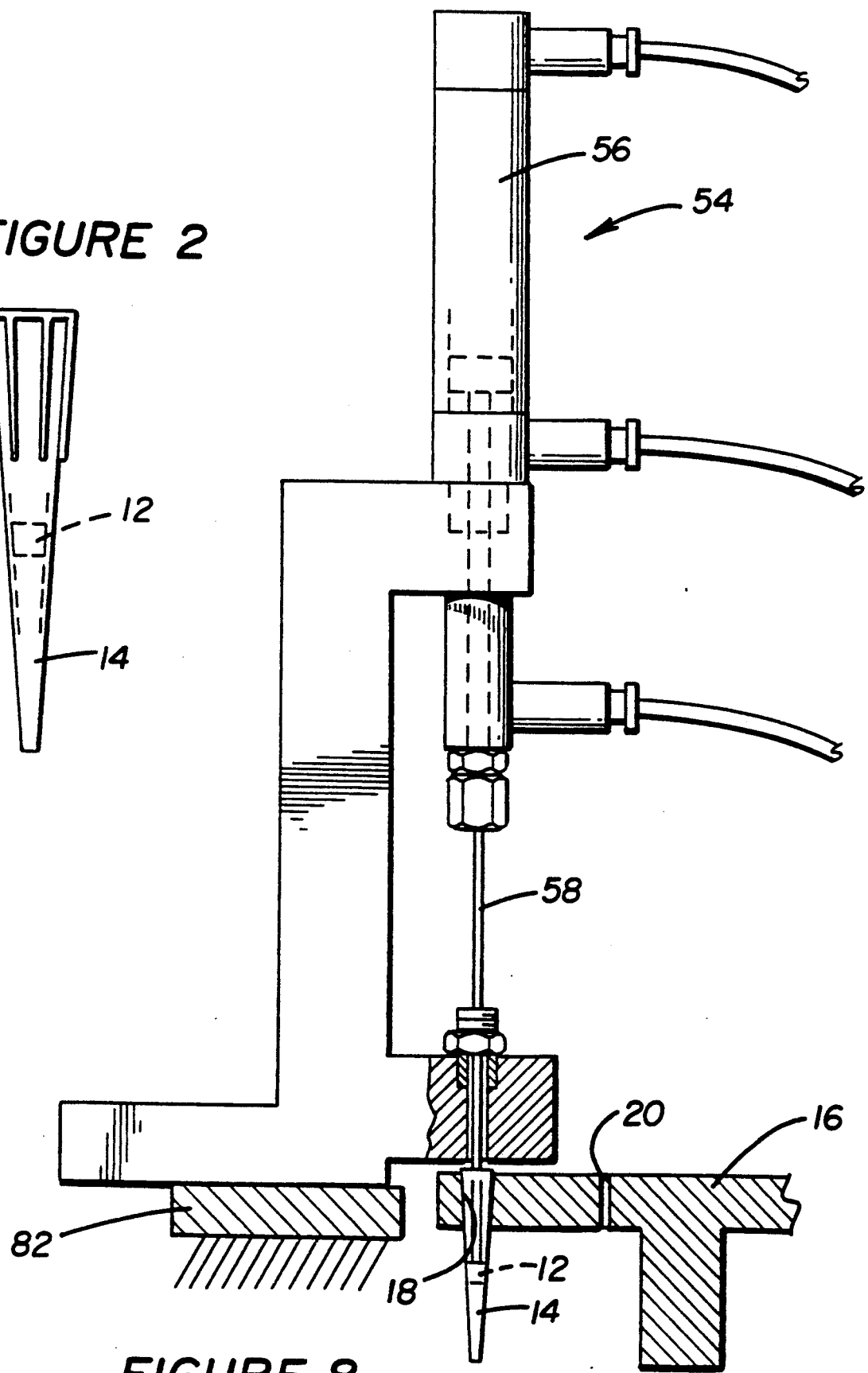
FIG. 2 is a view of a pipette tip with a filter inserted.
FIG. 8 is a view partly in section of the filter tampers.

Referring to FIG. 1, a device 10 is depicted. Device 10 is utilized for placing a filter 12 (see FIG. 2) in a pipette tip 14. It should be understood that pipette tip 14 as shown in FIG. 2 is only one configuration of such a tip. Such tips are utilized once with a pipetter to perform tests on samples such as biological fluids and after use the tip is disposed of.

Referring again to FIG. 1, the device consists of a turntable 16 having adjacent its circumference a series of holes 18 in which pipette tips 14 may be positioned either manually as shown in FIG. 1 or through an automated system which will be subsequently discussed.

Turntable 16 also includes adjacent the holes 18 a series of indexing holes 20. Preferably the indexing holes 20 are positioned on a radius extending inwardly from hole 18 toward the center of turntable 16. The purpose of the indexing holes will become clear in the ensuing discussion.

Arranged around the periphery of turntable 16 are various devices which will be generally described and then subsequently described in detail. Moving clockwise around the turntable the first device encountered is a sensing device 22 positioned so that a light sensing element 24 will determine whether pipette tip 14 is seated in hole 18. This step is necessary to insure that the subsequent filter inserting devices do not come in contact with pipette tip 18.

In an alternative embodiment, a second light sensing device 122 may be positioned below turntable 16 to determine if a pipette tip is in fact present in hole 18. In both the primary and alternate embodiments, if sensing device 22 determines that the pipette tip 14 is incorrectly positioned in hole 18, a signal may be sent to the controller (to be described below) stopping the rotation of turntable 16.

Next in line, counterclockwise, mounted adjacent to turntable 16 is a cutter-inserter device 26. This device is shown in greater detail in FIGS. 6 and 7 and reference should be made to those figures to follow the description.

Cutter-inserter device 26 cuts from an elongated filter 28 the short filter 12 for insertion into the pipette tip 14. Cutter-inserter device 26 consists of a housing 30 to which are affixed three pneumatic cylinders, cylinder 32 mounted vertically, cylinder 34 mounted tangentially relative to turntable 16 and cylinder 36 mounted radially relative to turntable 16. Each of these cylinders has a distinct function in the cutting and inserting feature of this device.

Cylinder 34 has affixed to its extending piston rod 38 a blade 40 Which extends into housing 30. Blade 40 is shown in its retracted position in FIG. 7. Blade 40 is positioned at a distance d (see FIG. 6) above a channel 42 formed in housing 30. Elongated filter 28 extends downwardly into this channel through a hole 44 vertically formed in housing 30. Filter 28 is free to drop by gravity so that its lower end comes in contact with the bottom of channel 42. Upon actuation of cylinder 34 blade 40 is moved into channel 42 to cut a portion of elongated filter 28 to a length equal to distance d. Blade 40 is then retracted. The distance d provides a filter of sufficient length to accomplish the objects of the invention.

Figure 6:
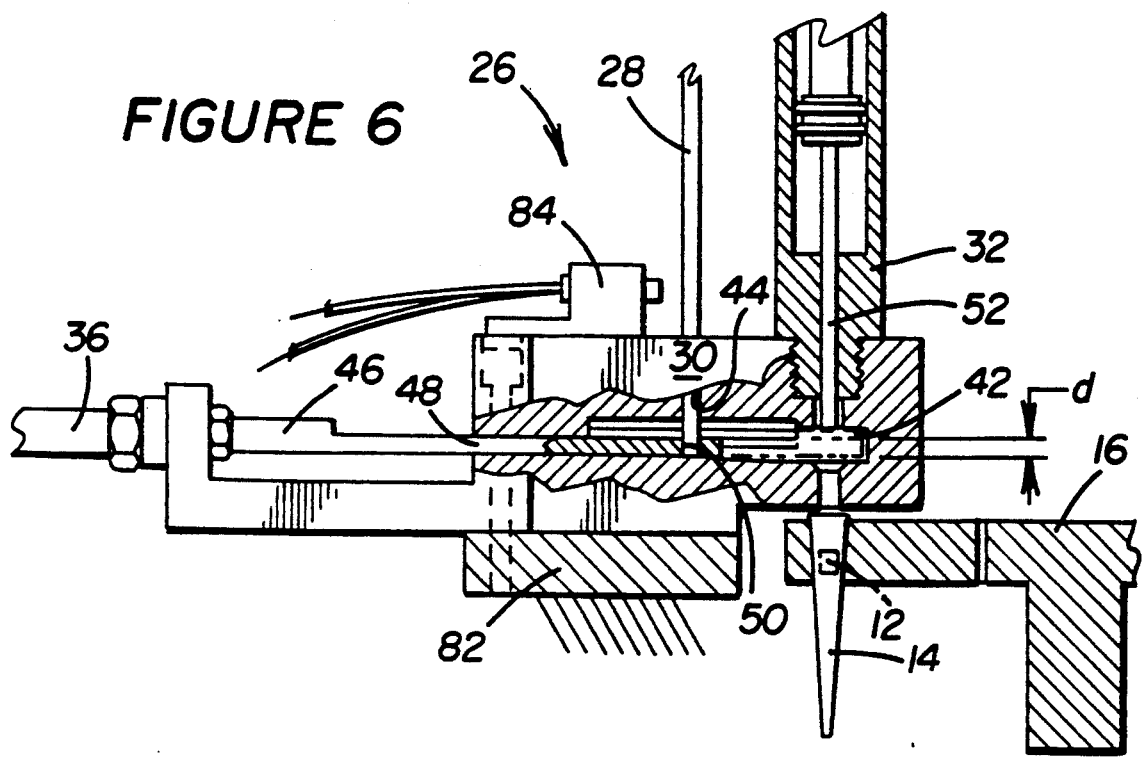
FIG. 6 is a view partly in section at line 6—6 of FIG. 3 of the filter cutter-inserter.
Figure 7:
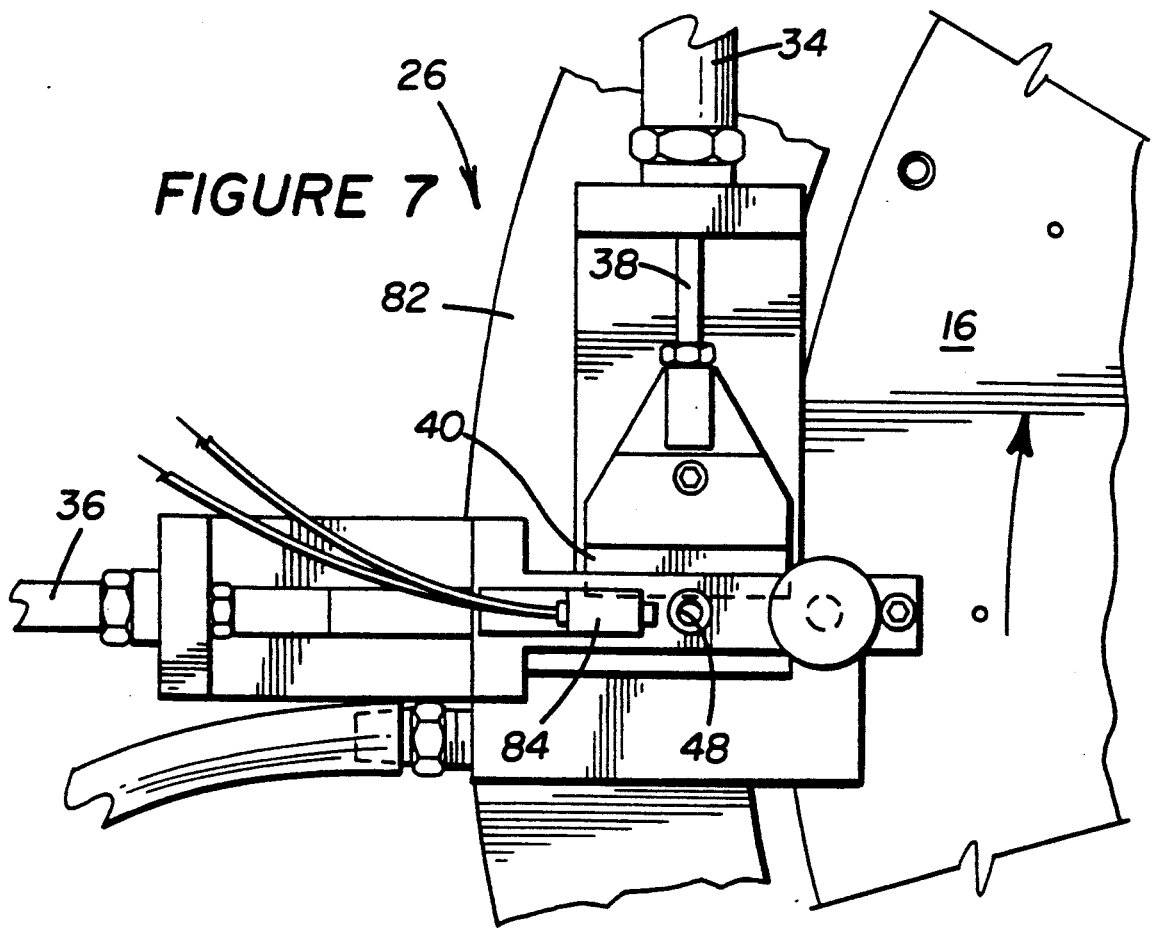
FIG. 7 is a plan view of the filter cutter-inserter shown in FIG. 6.
Figure 11:
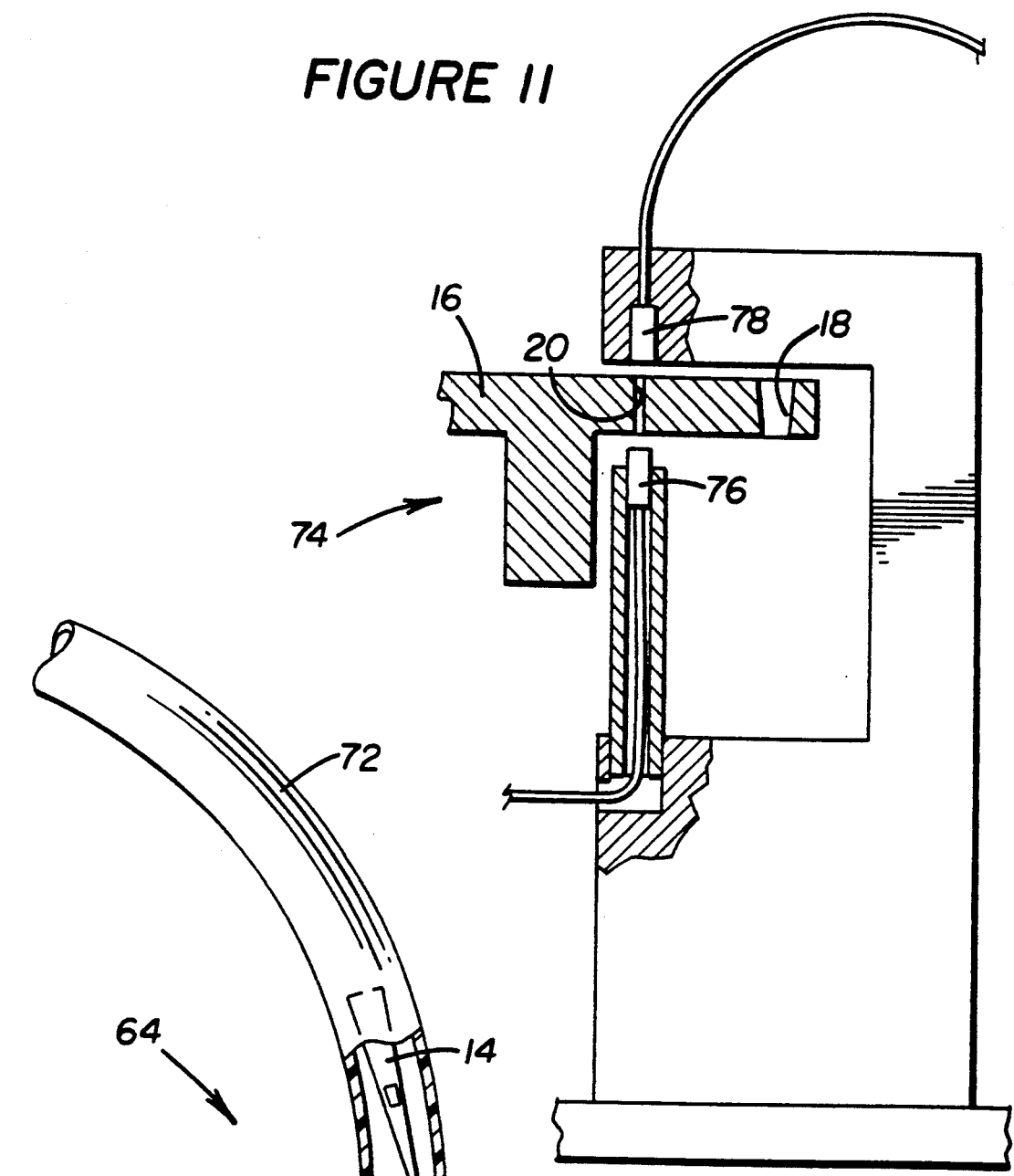
FIG. 11 is a view partly in section of the indexing device.
Figure 10:
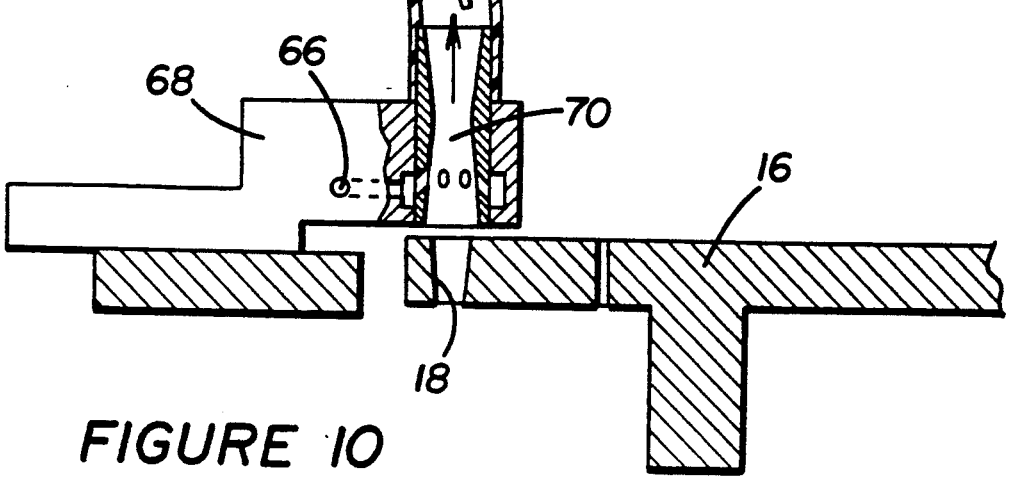
FIG. 10 is a view partly in section of the pipette extraction station.

Cylinder 36, which is located radially outward from cutter-inserter 26 has affixed to its piston rod 46 a transporter member 48. Referring to FIG. 6, it can be seen that filter 28 extends downwardly into transporter 48. When blade 40 is actuated the portion of elongated filter 28 that is cut off remains in transporter 48 in a defined hole 50. Upon actuation of cylinder 36, transporter 48 is moved rightwardly in FIG. 6 so that hole 50 arrives above the bore of pipette tip 14 located in turntable 16. At this point the then cut off filter 12 drops downwardly into pipette tip 14. Once filter 12 leaves transporter 48, rod 46 is withdrawn by cylinder 36 and the initial tamping process takes place. In this sequence the rod portion 52 of cylinder 32 is moved downwardly into pipette tip 14 to position filter 12 at approximately the position shown in FIG. 6.

Again moving clockwise about turntable 16, the next device encountered is the tamper 54. Reference should now be made to FIG. 8 wherein the tamper is shown partly in section. Tamper 54 consists of a cylinder 56 mounted vertically with reference to turntable 16. Affixed to the piston in cylinder 56 is an elongated rod 58 which upon actuation of cylinder 56 is extended downwardly into pipette tip 14 to seat the filter 12 at its final position. At this point it should be noted that filter 12 is positioned in the pipette tip sufficiently far from the end so that a predetermined sample may be drawn into the pipette tip without coming into contact with the filter. Thus, device 10 can be adjusted for different capacity pipette tips by adjusting the tamping position accomplished by tamper 54. Such adjustment may take place by moving cylinder 54 upwardly and downwardly relative to turntable 16 or by other means well-known in the art to adjust the stoke of the piston.

Figure 3:
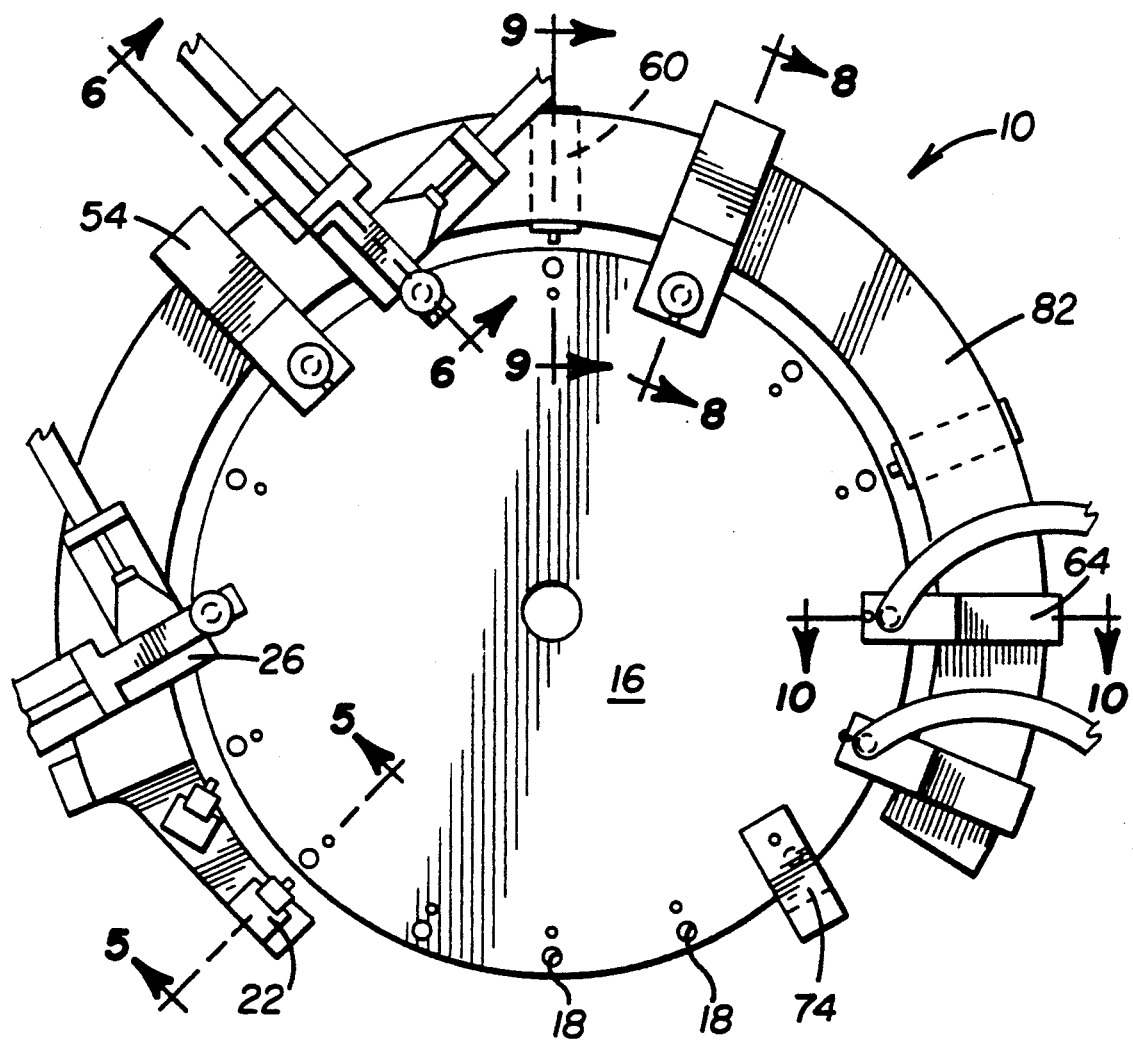
FIG. 3 is a plan view of the embodiment of FIG. 1 with a second set of filter inserters included.
Figure 4:
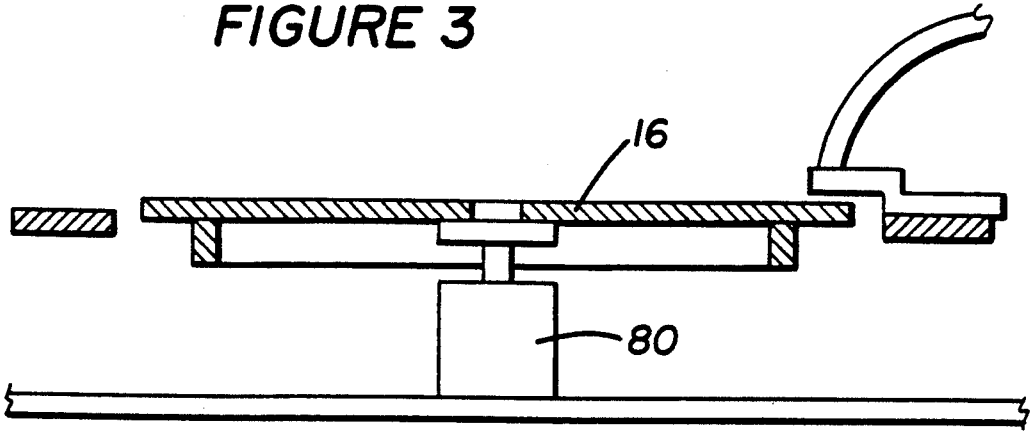
FIG. 4 is a schematic elevation view of the turntable of filter inserter shown in FIG. 1.
Figure 9:
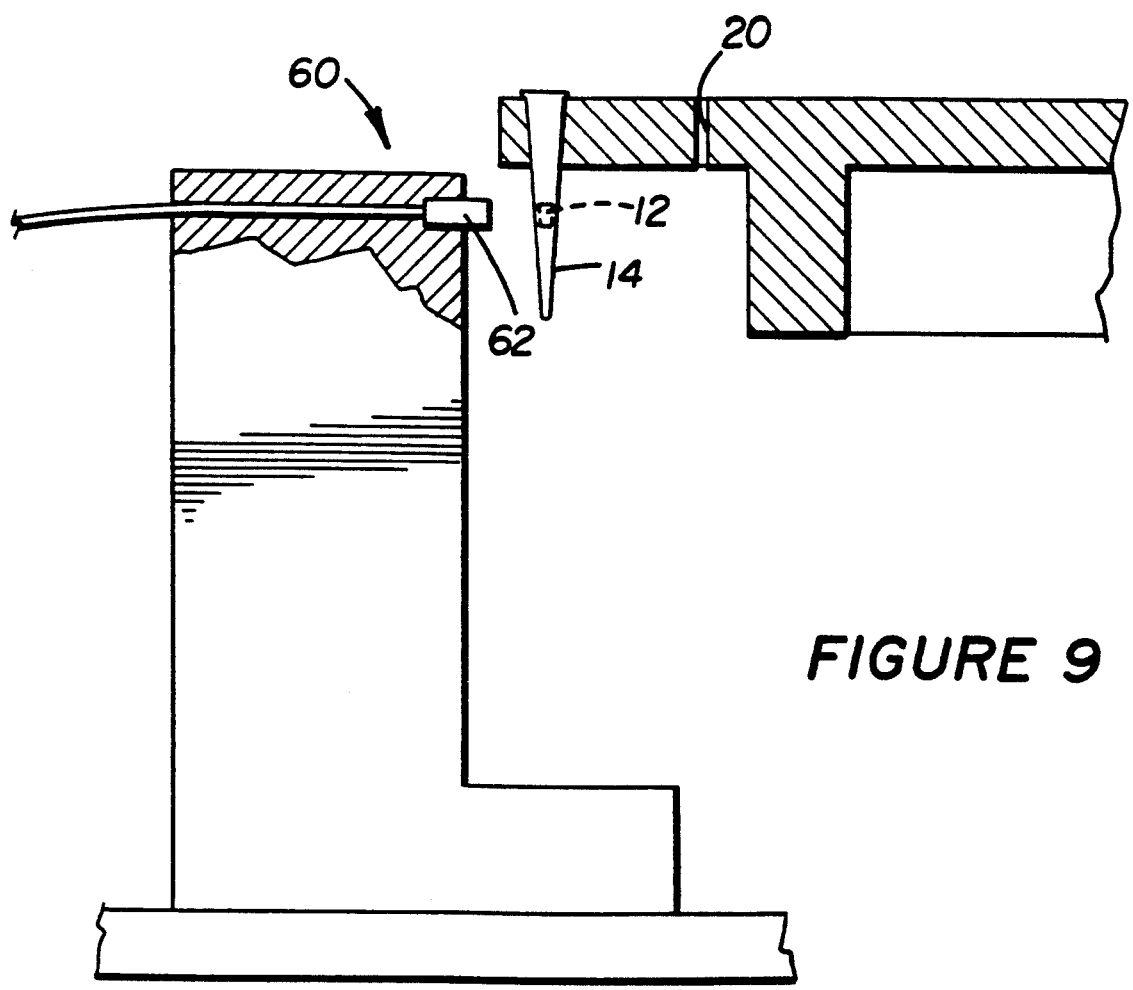
FIG. 9 is a view partly in section of the filter checker.

Moving further around turntable 16 in a clockwise manner (refer to FIG. 3) there is positioned below turntable 16 a filter sensor 60. Reference should be made to FIG. 9. Filter sensor 60 consists of a light sensing device 62 positioned to receive a reflected signal from a filter 12 positioned in a tip 14 as shown in FIG. 9. The absence of a filter 12 in the tip 14 will be so indicated to the control unit to be described below.

The next element in a clockwise fashion about turntable 16 is the extractor 64. Extractor 64 utilizes pressurized air provided through a conduit 66 in a housing 68. Pressurized air in conduit 66 is provided to a venturi 70 positioned above hole 18 in turntable 16. The pressurized air provided to the venturi 70 creates a suction in tube 72 so that a pipette tip 14 is extracted from turntable 16 when it is indexed below the extractor 64.

The final item associated with turntable 16 is an indexer 74 positioned in the vicinity of turntable 16 so that a light activated sensor 76 will react a light source 78 when index hole 20 is moved between the two. The indexing scheme herein described is utilized to insure that the holes 18 in turntable 16 are properly aligned with the various stations previously described.

Turntable 16 is moved incrementally by a rotary actuator 80. The degree of rotation at each step is determined by the number of holes 18 in the circumference of turntable 18 in the circumference of turntable 18 and how many elements such as the cutter-inserter are installed. Incremental steps of rotation are preferably equal with the arcuate sum of all the steps being equal to 360 degrees. Rotary actuator 80 is sold under the brand name Rotomation and is available from an organization called Peco in San Francisco, Calif. Rotary actuator 80 is operable by air pressure and actuated through a computer control system. Alternatively a stepping motor could be used.

The elements set forth above, specifically the tip sensor 22, a cutter-inserter 26, the tamper 54, the filter sensor 60, the extractor 64 and the indexer 74 are mounted on a mounting 82 which is arcuate in shape and surrounds at least a portion of turntable 16.

Referring now to FIG. 6, there also exists a sensing device 84 which determines the presence or absence of elongated filter 28. In particular, if elongated filter 28 is exhausted and no filter is sensed by sensing device 84, a signal is sent to the controlling circuitry to stop the turntable 16 until an additional filter is placed in cutter-inserter 26.

Figure 12:
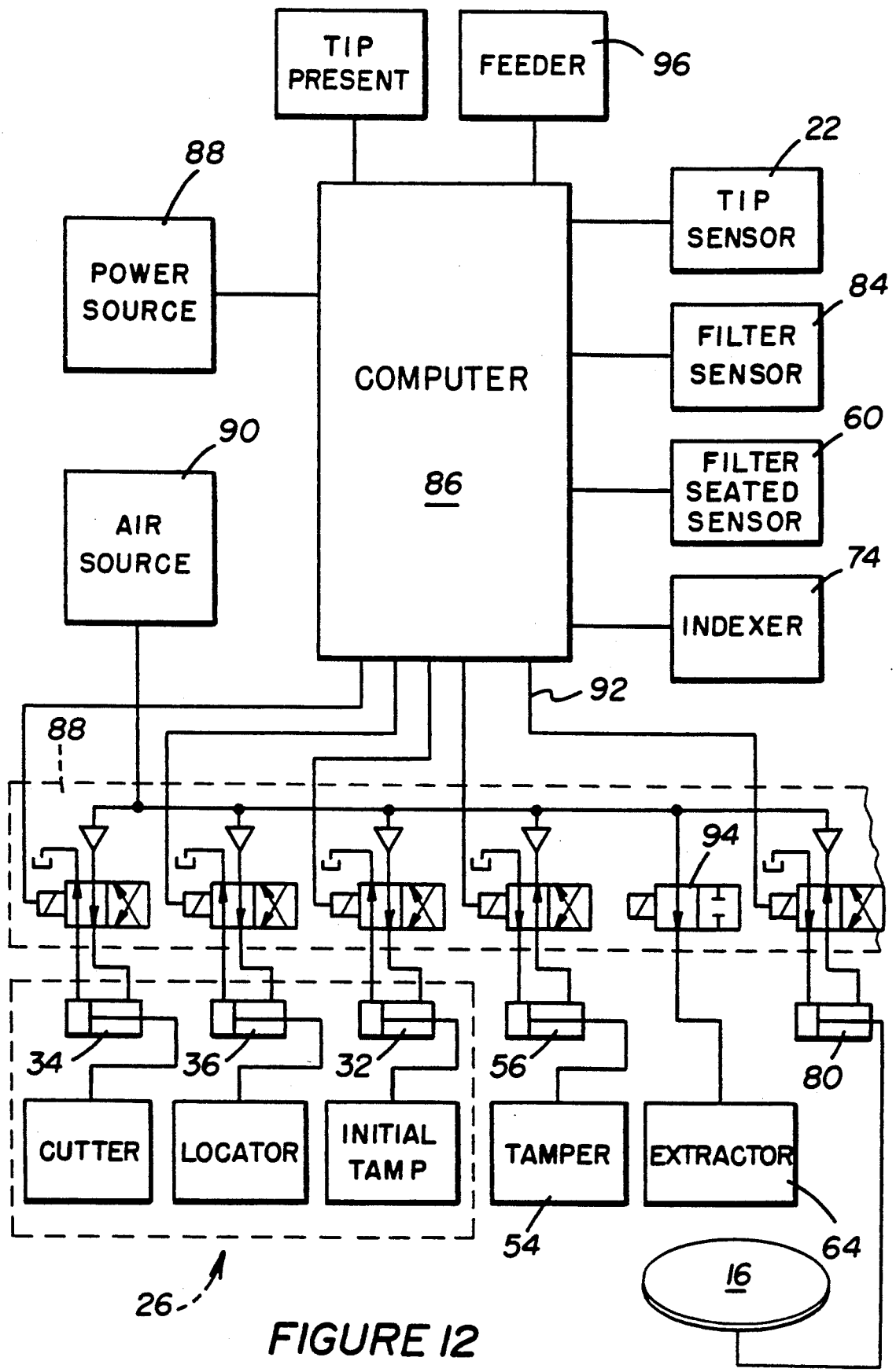
FIG. 12 is a schematic view of the device with its controlling microprocessor.

Reference should now be made to FIG. 12 wherein a schematic of the overall controlling circuitry is shown.

The basic control for the unit is contained in a computer controller 86 available in the marketplace from Control Technology Corporation. Computer 86 receives its power from a power source 88 which may be conventional 110 volt house power. It should be understood that power source 88 would also be utilized for any power applications in the device that may be operable by solenoid or the like through computer 86. Signals responding to a query from computer 86, from the tip sensor 22 or the filter sensor 84, the filter seated sensor 60 and the indexer 74 are fed to computer 86 for appropriate action. Based on the signals received from the sensor, computer 86 sends outgoing signals to a pneumatic manifold 88, available from Bay Pneumatic in San Francisco, Calif., which in turn controls a series of valves that provide air pressure at appropriate times to cutter-inserter 26, in particular cylinder 34 that operates a cutter portion, cylinder 36 that locates the cut filter over the pipette tip and tamping cylinder 32 that positions the filter in the pipette tip. Tamper 54 is, in like manner, provided with air to its cylinder 64 and in like manner receives air through manifold 88 from the air source 90. Finally, rotary actuator 80 here depicted in FIG. 12 as a cylinder for schematic purposes receives air through manifold 88 for step rotation of turntable 16. Manifold 88 which is shown schematically may be positioned at or adjacent to the turntable with connections to the particular cylinders provided by flexible conduit such as conduit 92 (see FIG. 1).

Figure 13:
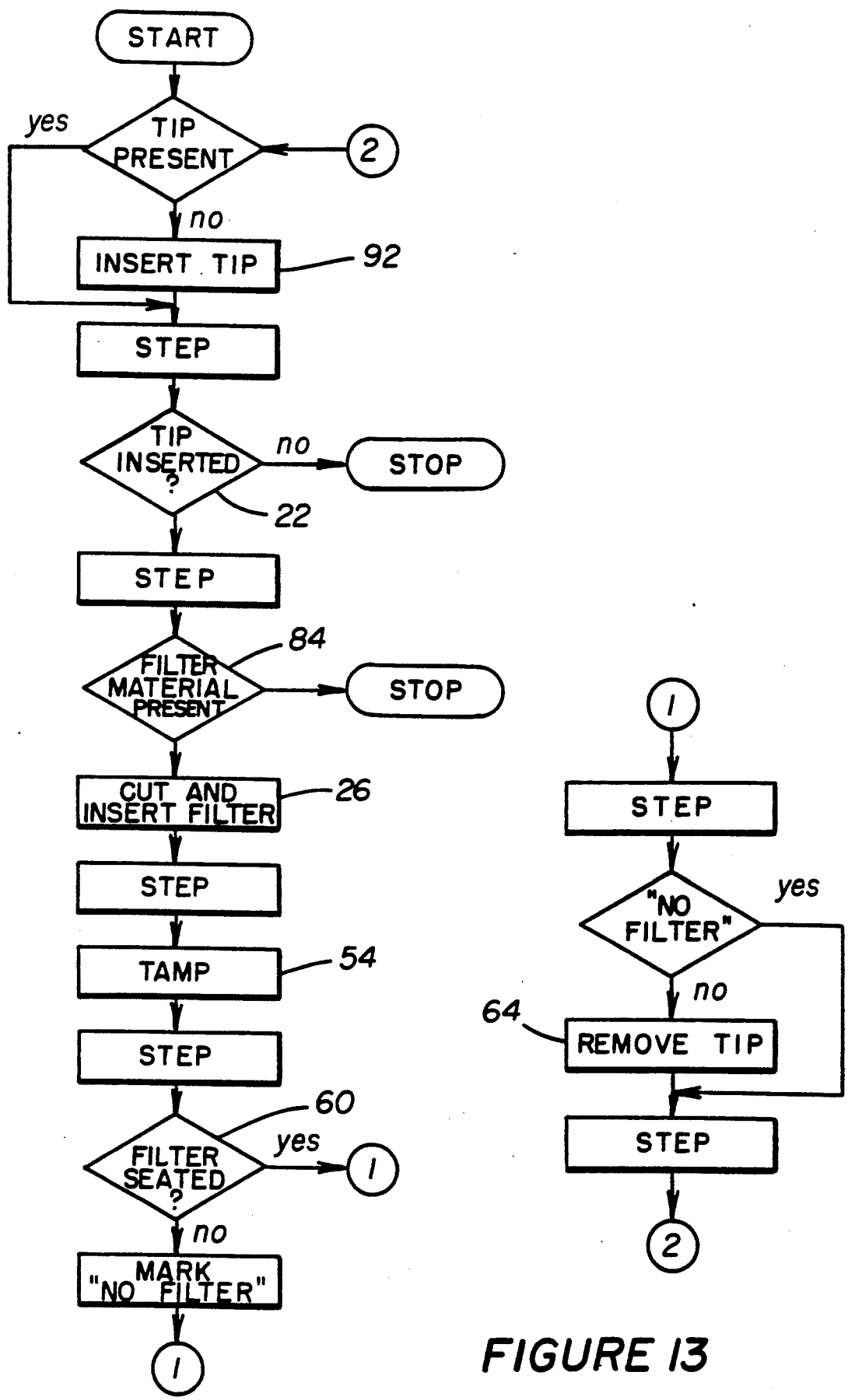
FIG. 13 is a sequential flow chart of the operation of the device.

Operation of the embodiment just described is depicted in the flow chart shown in FIG. 13. The flow chart shown in FIG. 13 is based on a single rotation of turntable 16 with the decision blocks and operation blocks associated with each of the elements of the tip inserter. It should be understood that this is a repetitive flow chart and for each rotation of one of the holes 18, each of the steps denoted therein occurs. As the turntable is rotated, the stopped position is first checked by the computer sending a signal to indexer 74. If the turntable is not aligned the device is stopped for alignment.

Initially, an operator checks to see if there is a tip present and if not, inserts the tip as indicated in step 92. The turntable is then stepped or rotated a predetermined amount so that the tip will move into the range of sensing device 22. From now on in the description of this flow chart each of these stations will be referred to by the numeral associated with the structural member in FIG. 1. Further, it should be understood that FIG. 1 as shown, has the minimum number of stations with the exception of two extractors 64 namely, 64 and 64'. It has been found that this device can operate with sets of two or more of each of the various devices. This is shown in the plan view in FIG. 3 but for convenience sake and clarity only one of each device is shown in FIG. 1 with the exception of the extractor 64.

After checking to see if the tip is inserted by sensor 22, the turntable is stepped or rotated again so that the tip is placed adjacent to cutter-inserter 26. The filter sensor 84 checks to see if there is filter material present and then the steps of cutting and inserting the filter by use of cylinder 34, cylinder 36 and cylinder 32 take place. Once these steps have occurred a signal is sent from computer 86 to the rotary actuator 80 and the turntable is moved another step to tamper 54 at which time the filter is seated at the desired position in pipette 16. The turntable is stepped again and the filter checked by the filter seated sensor 60. If it is determined that no filter is present that particular hole 18 is marked in effect, "no filter." The turntable is stepped again so that the pipette tip with the filter in place is moved to extractor 64. If there is no filter in the tip in hole 18 then a signal is sent to a valve 94 so that the air supply is cut off to venturi 70 and the tip is not extracted from the table. The turntable 16 is then rotated and the process repeated.

It should be noted that in FIG. 1, the present preferred embodiment, the turntable is indexed through two arcuate positions as it envisions operating on two tips simultaneously. It should be understood that more than two tips could be operated at one time either in a rotary fashion or in a linear arrangement. In an alternate rotary arrangement the corresponding holes 18 could be on radii of the turntable. In an alternate linear arrangement the corresponding holes 18 could be arranged transversely across a continuous belt with the various devices arranged along the path of the belt.

ALTERNATE EMBODIMENT

Figure 14:
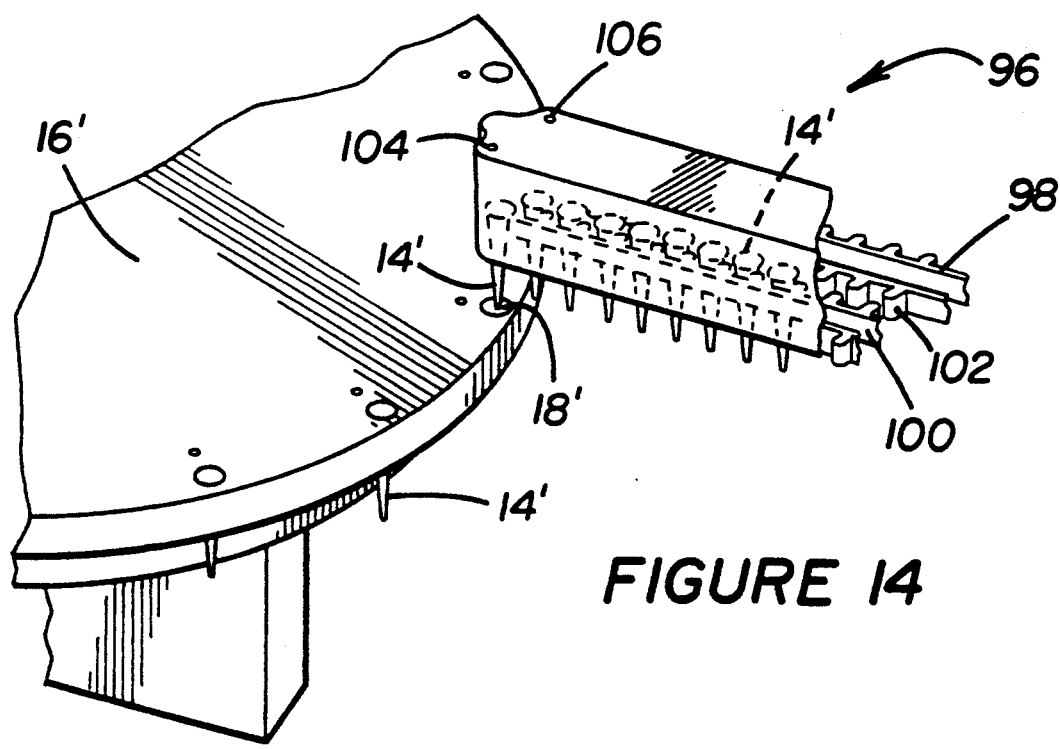
FIG. 14 is a tip feeder for the device.
Figure 15:
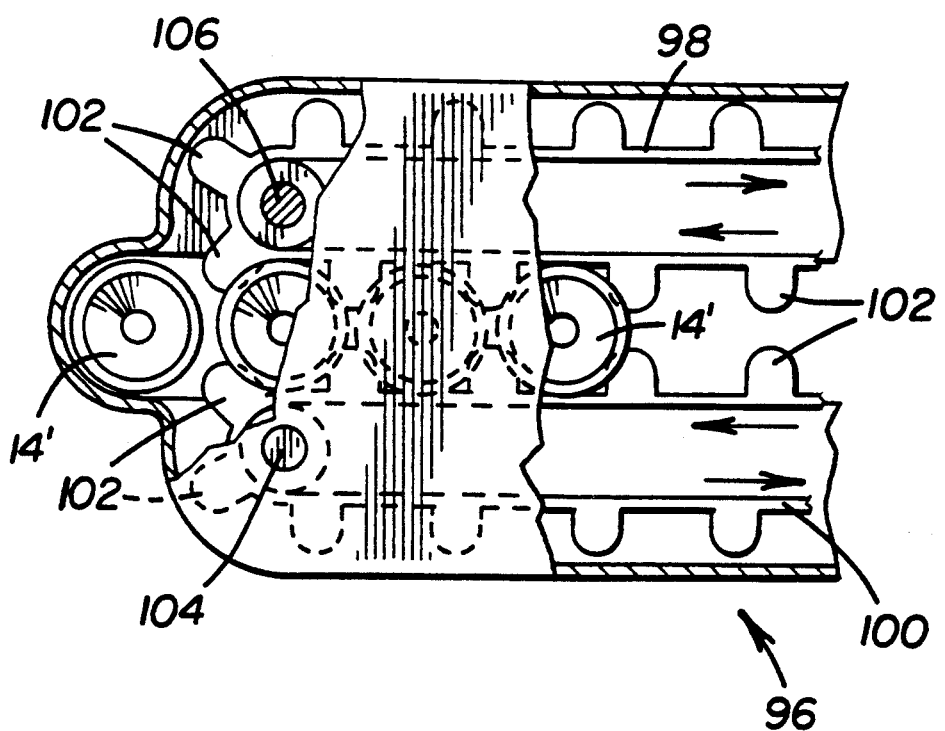
FIG. 15 is a plan view of a portion of the tip feeder shown in FIG. 14.

The configuration just described covers the present preferred embodiment. It is envisioned that the improvements can be made in this device so that automatic feeding of the pipette tips can occur. As noted in FIG. 1, the feeding in the present embodiment is accomplished by a human being. Reference should be made to FIG. 14 and 15 wherein a feeding device for pipette tips 14' is shown. Feeding device 96 consists of two endless belts 98 and 100 having outwardly extended bosses 102 formed such so that when the belts 98 and 100 are moved in the direction indicated in FIG. 15 the bosses act as grippers for the individual pipette tips 14'. As the belts approach their drive members 104 the bosses 102 separate and the tip 14' is permitted to drop into the hole 18' in turntable 16'. The belts 98 and 100 are preferably coordinated with the movement of the turntable by the computer 86 so that for each fractional rotation of turntable 16 a new pipette tip is fed to a hole 18'. As noted in the description of the preferred embodiment, if the table is stepped two holes at a time as would be done in the embodiment shown in FIGS. 1 and 3, there would be of necessity two feeders of the type just described.

Figure 5:
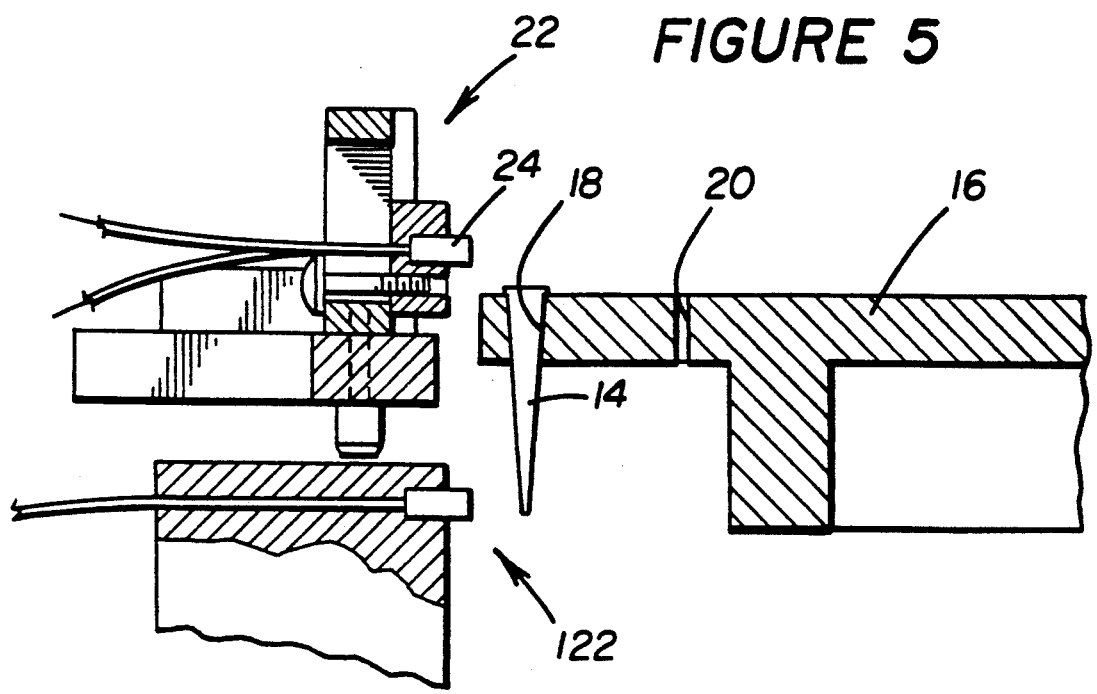
FIG. 5 is a sectional view at line 5—5 of FIG. 3 of the portion of the device that insures the tip is properly positioned in the turntable.

In addition to the feeder, reference should be made to FIG. 5 wherein beneath sensor 22 which senses whether or not the tip 18 is properly positioned in the turntable 16, an additional sensor 122 is added to determine if a tip is present. If no tip is present in the particular hole 18, then that hole is marked "no tip" and no action will occur at cutter-inserter 26, tamper 54 and extractor 64.

Finally, a sensor can be added to extractor 64 to determine if a tip has been removed from the turntable.

Figure 16:
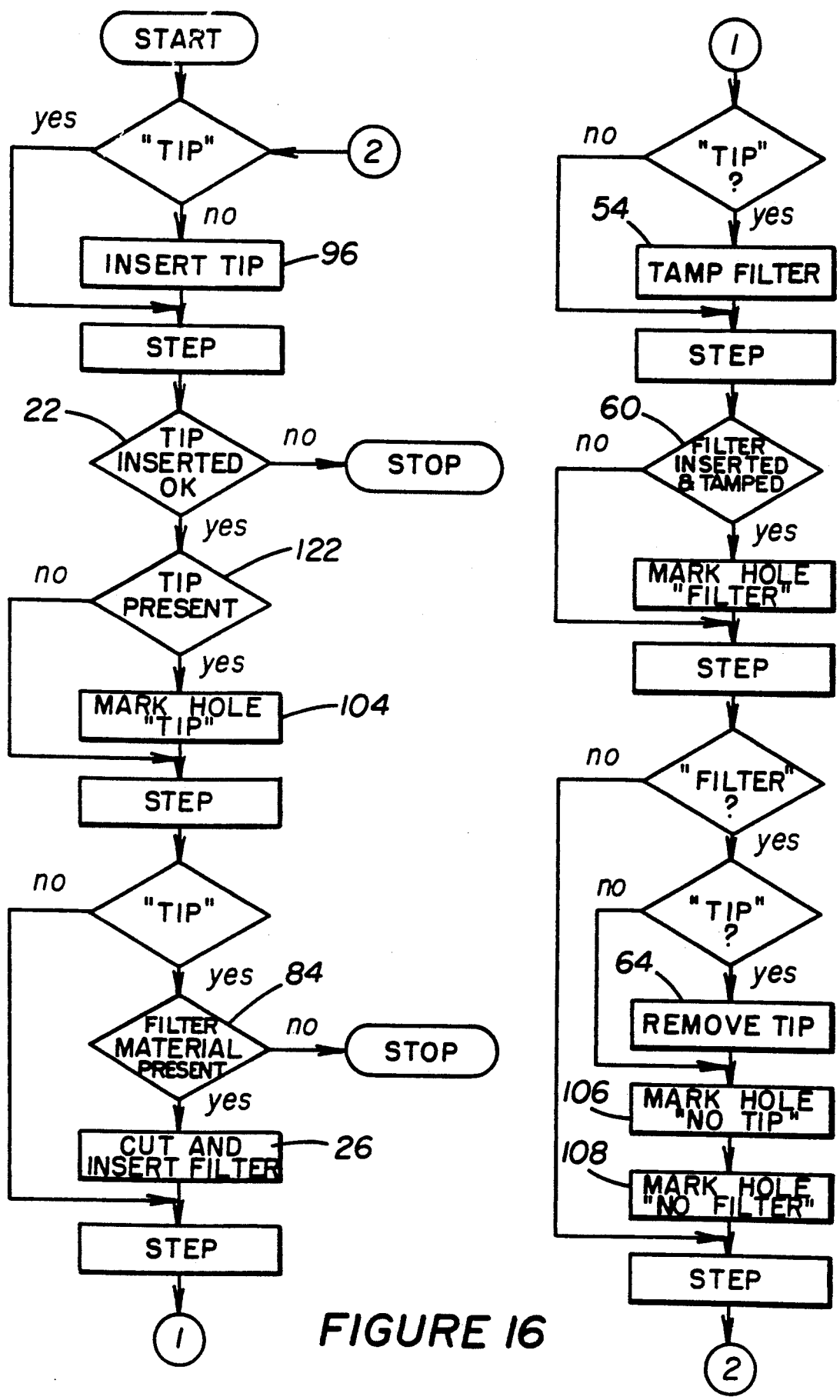
FIG. 16 is a sequential flow chart of the operation of the device with an automatic tip feeder.

Reference should be made to FIG. 16 wherein a flow chart similar to the flow chart shown in FIG. 13 is shown with the automatic feed feature just described. The tip is inserted by tip inserter 96 and checked to see if it is properly inserted in the same manner as the previous or primary embodiment at sensor 22. A second sensor 122 also checks to see if a tip is present. If there is a tip present the hole is marked "tip" as indicated in operation block 104. At each subsequent step then the information stored in relation to the particular hole 18' whether or not a tip is present is checked before a signal is sent to the manifold 88 to actuate the various cylinders and the like. Once the filter is inserted and tamped by the sensor 60, then not only is the presence of a filter checked but also the presence of a tip. If both a tip and a filter are present then the tip is removed in the same manner by extractor 64. At that point the hole is marked "no tip" and "no filter" by operation blocks 106 and 108. At that point the table is stepped to the point where the tip inserter becomes operative again. If there is no tip present then a new tip is inserted however, if there is a tip present no action is taken at the tip inserter.

While this invention has been described in relation to a particular embodiment, it should be considered limited only so far as the following claims.

I claim:

1. A device for cutting and inserting filters in pipette tips comprising:

conveying means for transporting a pipette tip from a first position to at least one subsequent later position, an elongated fiber filter, cutting means for cutting a predetermined length of said elongated fiber filter, inserting means for inserting said predetermined length of said elongated fiber filter into the pipette tip, filter sensing means for determining if the pipette tip arriving in said subsequent later position has received a filter, and removal means for removing only those pipette tips from the conveying means that have received a filter, said conveying means comprising a turntable and rotating means for rotating the turntable in increments of a circle so that a pipette tip may be transported from said first position to the at least one subsequent later position, said turntable defining a series of equally spaced holes adjacent the circumference thereof, each hole adapted to receive a pipette tip, and tamper means for seating an inserted filter at a predetermined location in said pipette tip before said pipette tip arrives in said subsequent later position.

2. The device of claim 1 wherein said cutting means and said inserting means are positioned adjacent said conveying means at said first position.

3. The device of claim 2 wherein the removal means is positioned adjacent said conveying means at the at least one subsequent position.

4. The device of claim 3 wherein the filter sensing means is positioned adjacent said conveying means between said first position and said at least one subsequent position.

5. A device for cutting and inserting filters in pipette tips comprising:

conveying means for transporting a pipette tip from a first position to at least one subsequent later position, an elongated fiber filter, cutting means for cutting a predetermined length of said elongated fiber filter, inserting means for inserting said predetermined length of said elongated fiber filter into the pipette tip, filter sensing means for determining if the pipette tip arriving in said subsequent later position has received a filter, removal means for removing only those pipette tips from the conveying means that have received a filter, and tamper means for seating an inserted filter at a predetermined location in said pipette tip before said pipette tip arrives at said subsequent later position.

6. The device of claim 5 wherein the conveying means comprises a turntable and rotating means for rotating the turntable in increments of a circle so that a pipette tip may be transported from said first position to the at least one subsequent later position.

7. The device of claim 6 wherein the turntable defines a series of equally spaced holes adjacent the circumference thereof, each hole adapted to receive a pipette tip.

8. The device of claim 7 wherein the means for rotating said turntable comprises a pneumatically actuated rotator.

9. The device of claim 7 including means for determining whether a pipette tip is properly positioned in one of said holes before said hole reaches said first position and the device further including means for deactivating the turntable upon a determination that no pipette tip is in the one of said holes.

10. The device of claim 9 wherein said cutting means and said inserting means are positioned adjacent said conveying means at said first position.

11. The device of claim 7 wherein said removal means is deactivated upon a determination by the filter sensing means that the pipette tip has not received a filter.

12. The device of claim 7 further including placement means for positioning a pipette tip in said conveying means in one of said holes when said hole is at a position before said first position.

13. The device of claim 12 including means for determining whether a pipette tip is properly positioned in the one of said holes before said hole reaches said first position and the device further including means for deactivating the turntable upon a determination that no pipette tip is in the one of said holes.

14. The device of claim 5 wherein said removal means is deactivated upon a determination by the filter sensing means that the pipette tip has not received a filter.

15. A device for cutting and inserting filters in pipette tips comprising:

conveying means for transporting a pipette tip from a first position to at least one subsequent later position, an elongated fiber filter, cutting means for cutting a predetermined length of said elongated fiber filter, inserting mean for inserting said predetermined length of said elongated fiber filter into the pipette tip, filter sensing means for determining if the pipette tip arriving in said subsequent later position has received a filter, and removal means for removing only those pipette tips from the conveying means that have received a filter, said conveying means comprising a turntable and rotating means for rotating the turntable in increments of a circle so that a pipette tip may be transported from said first position to the at least one subsequent later position, said turntable defining a series of equally spaced holes adjacent the circumference thereof, each hole adapted to receive a pipette tip, and means for determining whether a pipette tip is properly position in one of said holes before said hole reaches said first position and the device further including means for deactivating the turntable upon a determination that no pipette tip is in one of the said holes.

* * * * *